(12) United States Patent
Joyner et al.

(10) Patent No.: US 6,437,905 B1
(45) Date of Patent: Aug. 20, 2002

(54) OPTICAL WAVELENGTH CONVERTER

(75) Inventors: Charles H Joyner, Red Bank; Jurg Leuthold, Eatontown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 118 days.

(21) Appl. No.: 09/611,572

(22) Filed: Jul. 7, 2000

(51) Int. Cl.$^7$ ............................... G02F 1/365
(52) U.S. Cl. .................... 359/332; 359/326; 385/122
(58) Field of Search ................ 359/326–332; 385/122

(56) References Cited

U.S. PATENT DOCUMENTS

| | | | | |
|---|---|---|---|---|
| 5,721,637 A | * | 2/1998 | Simon et al. | 359/344 |
| 6,256,137 B1 | * | 7/2001 | Hironishi | 359/332 |
| 6,282,015 B1 | * | 8/2001 | Ueno et al. | 359/332 |
| 6,323,992 B1 | * | 11/2001 | Ueno | 359/332 |

FOREIGN PATENT DOCUMENTS

EP      0 875 782 A2    4/1998    ............. G02F/2/00

OTHER PUBLICATIONS

Leuthold et al, "Compact and Fully Packaged Wavelength Converter with Integrated Delay Loop for 40 Gbit/s RZ Signals", Optical Fiber Communication Conference 2000, vol. 4, pp. 218–220, Mar. 2000.*

Leuthold et al, "100 Gbit/s All–Optical Wavelength Conversion With Integrated SOA Delayed–Interference Configuration", Electronics Letters, vol. 36, No. 13, pp. 1129–1130, Jun. 22, 2000.*

J. M. Weisenfeld, "Wavelength Conversion at 10 Gbit/s Using a Semiconductor Optical Amplifier", *Photon Technol. Lett.*, 5, (11), pp. 1300–1303 (1993)(Nov.).

K. Tajima, "All Optical Switch With Switch–Off Time Unrestricted by Carrier Lifetime", *Jpn. J. Appl., Phys.*, vol. 32, No. 12A, pp. L1746–1749; Dec. 1993.

K. E. Stubhkjaer et al, "Optical Wavelength Converters", *Proc. European Conf. on Opt. Communication*, Firence, Italy, vol. 2, pp. 635–642, Sep. 1994.

J. M. Weisenfeld, "Wavelength Conversion for Optical Networks", Second Optoelectronic and Communications Conference (OECC '97), Technical Digest, pp. 426–427, Jul. 1997.

Y Ueno et al, "3.8–THz Wavelength Conversion of Picosecond Pulses Using a Semiconductor Delayed–Interference Signal–Wavelength Converter (DISC)", *Phton. Technol. Letters*, vol. 10, No. 3, Mar. 1998, pp. 346–348.

* cited by examiner

*Primary Examiner*—John D. Lee
(74) *Attorney, Agent, or Firm*—Jeffery J. Brosemer; Barry H. Freedman

(57)    ABSTRACT

A wavelength converter with a monolithically integrated delay loop in a delayed interference configuration that needs only one SOA, only one in and one output fiber. Unlike prior-art hybrid wavelength converters, our inventive device has a monolithically integrated delay loop utilizing an asymmetric splitting ratio.

6 Claims, 3 Drawing Sheets

OPTICAL WAVELENGTH CONVERTER

FIELD OF THE INVENTION

This invention relates generally to the field of optical communications and in particular to a method and apparatus for providing optical wavelength conversion employing cross phase modulation (XPM).

BACKGROUND OF THE INVENTION

All optical wavelength converters which operate at speeds beyond the limits of electronic devices will be essential components in future Wavelength-Division-Multiplexed (WDM) networks. As was shown in a paper entitled "Wavelength Conversion at 10 GBit/s Using a Semiconductor Optical Amplifier" which appeared in Photon Technol. Lett., 5, (11), pp. 1300–1303, (1993), J.M.Weisenfeld demonstrated all optical wavelength conversion using semiconductor optical amplifier (SOA) devices exploiting cross gain modulation (XGM) as well as cross phase modulation (XPM). As shown therein, in the XGM scheme a strong input signal and a cw signal are introduced into a nonlinear element. The input signal is used to saturate the gain of the nonlinear element and thereby modulates the cw signal carrying the new wavelength. In the XPM scheme, a strong input signal is used to modulate both the phase and intensity of a second signal. The modulation of this second signal is then exploited in an interferometric configuration for redirecting the signal from one output to an other.

Different interferometric configurations have been proposed. Some are based on Michaelson (MI), others are based on Mach-Zehnder interferometer (MZI) configurations with the nonlinear elements on one or both branches of the interferometer arms. (See, e.g., K. Tajima, "All Optical Switch with Switch Off Time Unrestricted by Carrier Lifetime; Jpn. J. Appl, Phys. Vol., 32, No. 12A, pp. L1746–1749; December 1993; K. E. Stubkjaer, T. Durhuus, B. Mikkelsen, C. Joergensen, R. J. Pedersen, C. Braagaard, M.Vaa, S. L. Danielsen, P.Doussiere, G. Garabedian, C. Graver, A. Jourdan, J. Jacquet, D. Leclerc, M. Erman, and M. Klenk, "Optical Wavelength Converters"Proc. European Conf. on Opt. Communication, Firence, Italy, Vol., 2, 635–642, September 1994; J.M.Weisenfeld, "Wavelength Conversion for Optical Networks", Second Optoelectronic & Communications Conference (OECC97), Technical Digest, pp. 426–427, July 1997. Recent developments include hybrid wavelength converters, using only a single SOA followed by a delay-interference section, formed by a calcite crystal. (See, Y. Ueno, S. Nakamura, K. Tajima, S. Kitamura", "3.8 THz Wavelength Conversion of Picosecond Pulses Using a Semiconductor Delayed-Interference Signal-Wavelength Converter (DISC)", Photon. Technol. Letters, Vol., 10, No. 3, March 1998; Y. Ueno, K. Tajima, "Wavelength Converter", EP 0 875 782 A2.

Despite these advances however, these delay interference wavelength converter schemes is hybrid in nature and their operation is fairly limited.

SUMMARY OF THE INVENTION

We have developed an integrated wavelength converter with a monolithically integrated delay loop in a delayed interference configuration that needs only one SOA, only one in and one output fiber. Unlike prior-art hybrid wavelength converters, our inventive device has a monolithically integrated delay loop utilizing an asymmetric splitting ratio.

DETAILED DESCRIPTION OF THE INVENTION

Figure 1:
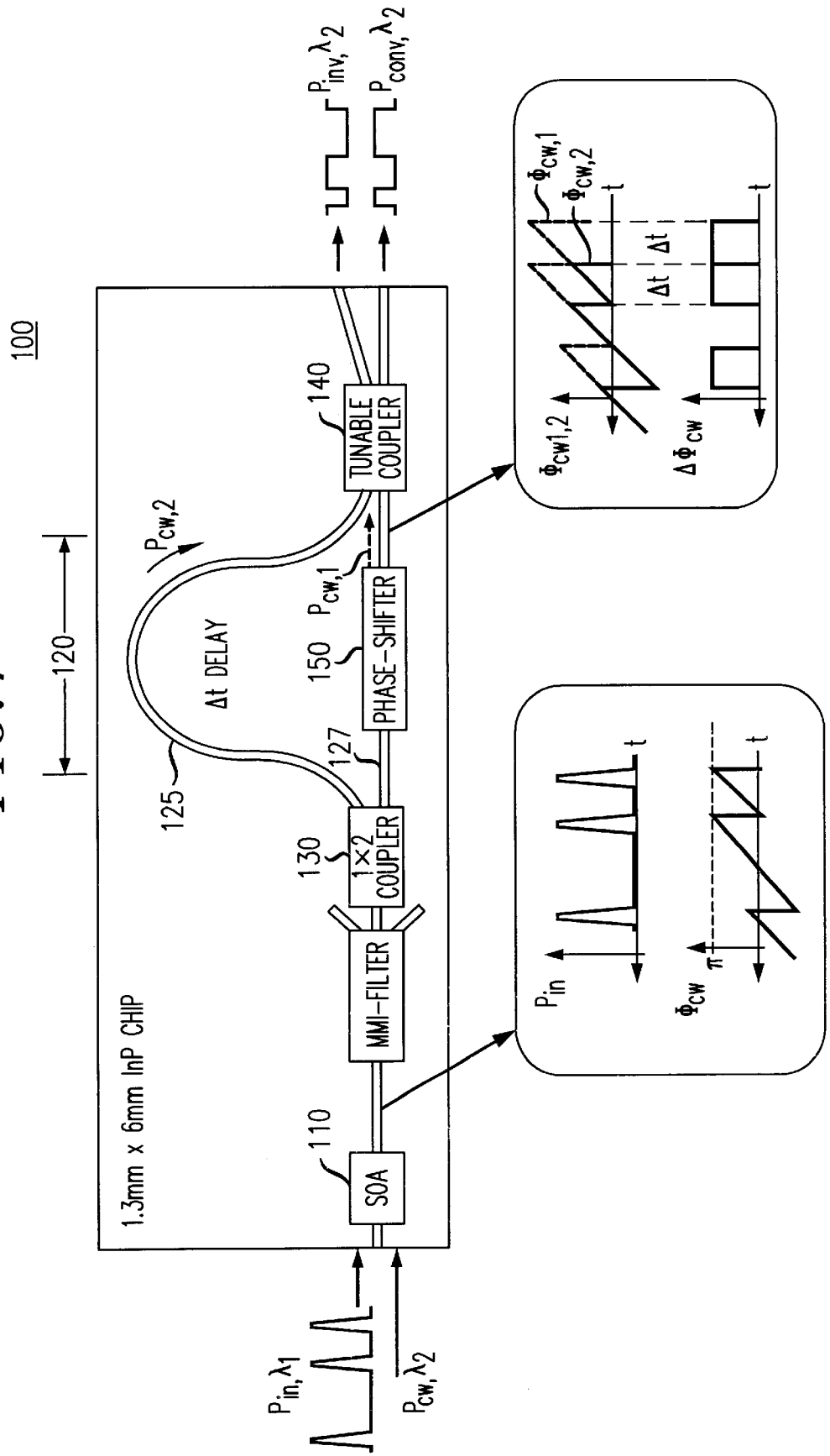
FIG. 1 is a schematic drawing illustrating our inventive wavelength converter.

With reference to FIG. 1, there is shown in schematic form a diagram depicting our inventive optical wavelength converter 100. It includes a semiconductor optical amplifier (SOA) 110 monolithically integrated with a delayed interference loop 120 which may be formed by a tunable or fixed, but asymmetric splitting ratio coupler 130 and a coupler 140, e.g., a 2×2 or 1×2 coupler. As can be readily appreciated by those skilled in the art, a longer arm 125 of the delayed interference loop 120 provides a Δt delay and shorter arm 127 of the delay interference loop 120 includes a phase shifter 150.

The device converts and reshapes a pulsed input signal $P_{in}$ at $\lambda_1$ into the wavelength converted signal $P_{conv}$ at $\lambda_2$. The pulsed input signal $P_{in}$ modulates the phase and the gain of copropagatmg CW signal $P_{cw}$ in the SOA. The rise time of the phases shift in the $P_{cw}$ signal is almost instantaneous and limited by the pulse width of the $P_{in}$ signal, whereas the fall time is limited by the slower, carrier recovery time. The power of an input pulse is chosen such that it modulates the phase of the cw signal by an amount, π. Upon exiting the SOA, the $P_{cw}$ signal is asymmetrically split between the longer arm 125 and the shorter arm 127 of the delayed interference loop 120 through the action of the asymmetric splitting ratio coupler 130. After traversing the respective arms of the interference loop 120, the signals are combined by coupler 140. The coupler 140 directs the $P_{cw}$ signal into a $P_{inv}$ output port if the two signals in the two arms of the interference loop have an equal phase, whereas it couples the signal into the $P_{conv}$ output port if the phase difference is π. The signal traversing the shorter arm 127 of the delay interference loop 120 carries the π phase shift first reaches the coupler 140, and open a "switching window" for the $P_{conv}$ output port. At approximately Δt=10 ps later, the $P_{cw}$ signal reaches the coupler 140, the phase difference is reset and the switching window in the $P_{conv}$ port closes.

In an exemplary construction, InGaAsP/InP wavelength converters may be grown by conventional Metal Organic Vapor Phase Epitaxy on (001) InP. The separate confinement heterostructure SOAs, having a length of approximately 1.2 mm may be grown first. Subsequently, the spotsize converters and passive waveguide layers are regrown using a butt coupling scheme to connect the two different layers in the same plane. Waveguides, couplers and phase shifters are defined by a wet etching step. The radius of the curved waveguides is substantially 250 μm and the total waveguide losses are below 3 dB. A doped, InGaAs layer is grown on top of the active SOS sections and phase-shifter sections to provide ohmic contacts. A representative size of such a packaging construction is approximately 6×1.3 mm. Subsequently, input and output ports may be fiber-pigtailed and the integrated device so constructed may be mounted with a temperature cooling unit into an additional (i.e., "butterfly") package. As noted previously albeit more generally, our inventive device converts and reshapes a RZ input signal $P_{in}$ at $\lambda_1$ into a wavelength-converted signal $P_{conv}$ at $\lambda_2$. The RZ input signal $P_{in}$ modulates the gain of the SOA and thereby the phase $\phi_{cw}$ of the copropagating cw signal $P_{cw}$ (left bottom inset of FIG. 1). The power of the RZ input signal has to be adapted such that it modulates the phase of the cw signal by $\pi$. The rise time of the induced phase shift in the $P_{cw}$ signal is almost instantaneous and only limited by the pulse width of the $P_{in}$ signal, whereas the fall time of the induced phase, decays with the somewhat slower carrier recovery time. After the SOA, the $P_{cw}$ signal is asymmetrically split between the two arms of the delay loop and recombined in the 2×2 coupler. The coupler directs the $P_{cw}$ signal into the $P_{inv}$ output port if the two signals in the arms are in phase, whereas it couples it into the $P_{conv}$ output port if the phase difference is $\Delta\phi_{cw}=\pi$. The $P_{cw}$ signal on the lower arm carrying the $\phi_{cw,1}+\pi$ phase shift first reaches the coupler and opens the switching window for the $P_{conv}$ output port (right bottom inset of FIG. 1). Substantially 10 ps later, when the $P_{cw,2}$ signal in the upper arm reaches the coupler, the phase difference is reset and the switching window in the $P_{conv}$ port closes. If a second input data pulse follow, the switching window is reopened by setting the phase of the lower arm again. In an exemplary situation, (100 Gbit/s), the bits are introduced in intervals of 10 ps. Because the delay at 10 ps equals the bit period of 100 Gbit/s, a NRZ format output is generated. By choosing a lower bit rate or a smaller delay loop, a RZ format output can be obtained with the same device.

Figure 2A:
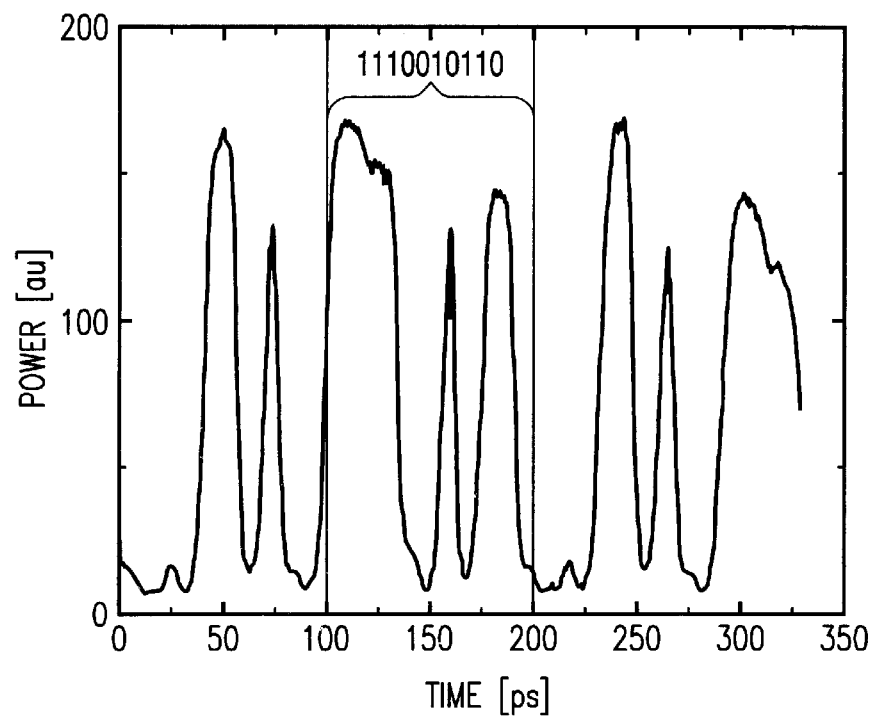
FIG. 2(a) is a graph depicting time resolved output power as measured with a streak camera demonstrating the high extinction rations and good quality of signals converted by the device of FIG. 1.
Figure 2B:
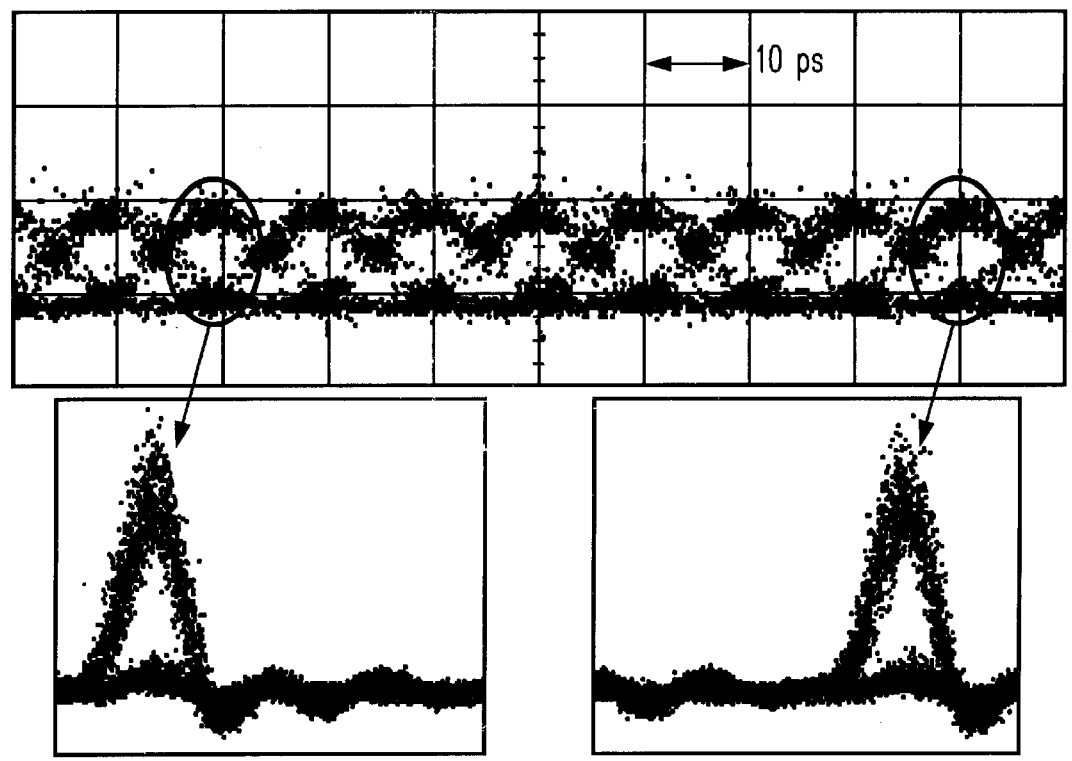
FIG. 2(b) is an eyediagram of a 100 Gbit/s signal as measured with a 50 GHz bandwidth photodiode.

For device characterization, RZ input data signals $P_{in}$ were generated at a pseudo random bit sequence (PRBS) of $2^{31}-1$ at 100 Bbit/s. The input signals exhibited a FWHM of ~3ps and an average power of 8 dBm in the device and were chosen at a wavelength of $\lambda_1=1.546$ $\mu$m. A cw signal $P_{cw}$ at $\lambda_2=1.560$ $\mu$m carrying the new wavelength was externally combined with the input signal and introduced into the input port. The phase shifter and the integrated tunable coupler were set such that the bit inverted and wavelength converted signal was directed to the output port. The bit inverted signals are more advantageous for high speed since they contain all the signal pulse energy, whereas the non-inverted pulses are suppressed by the XGM that inevitably goes along with the XPM effect. A streak camera picture of the bit inverted and wavelength converted signal is depicted in FIG. 2(a). Extinction rations larger than 13 dB, as enabled by the integrated phase shifter and tunable coupler, are visible. Both the leading and trailing pulse transients are steep. FIG. 2(b) shows eye diagrams of the 100 Gbit/s signal as recorded with a 50 GHz bandwidth photodiode. The eyediagrams of the second and ninth demultiplexed signals are shown as an example in the lower left and right inset of FIG. 2(b).

Figure 3:
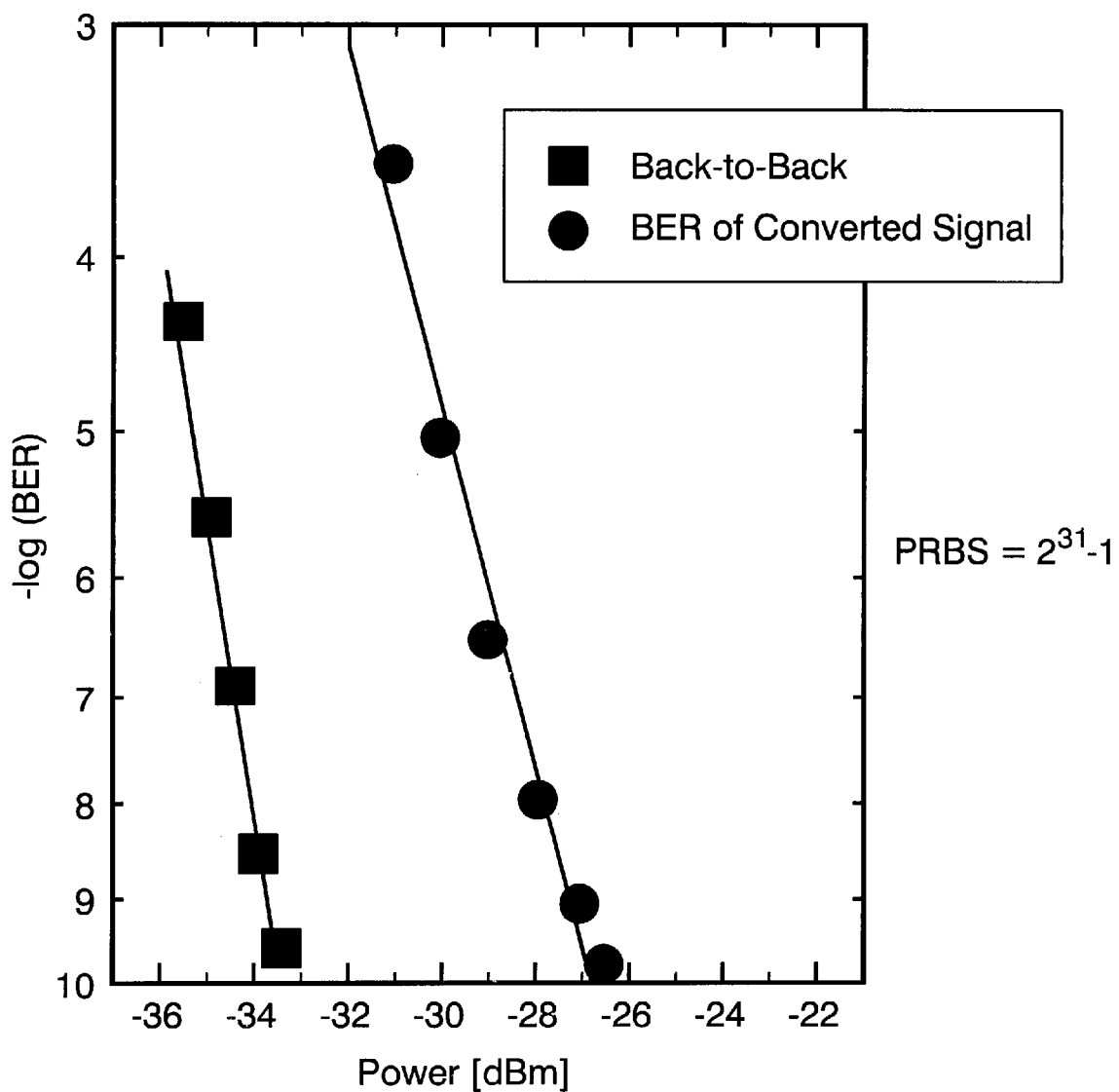
FIG. 3 is a graph showing measured BER of 100 Gbit/s wavelength converted signal vs received power an input to optical preamplifier.

Finally, the bit error rate (BER) performance is shown in FIG. 3. The BER of the converted 100 Gbit/s signal was measured after demultiplexing back to 10 Gbit/s and feeding this signal to an optically pre-amplified pin receiver. Thus, the received power is measured for 10 Gbit/is.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

What is claimed is:

1. A wavelength converter comprising:
    a semiconductor optical amplifier (SOA);
    an asymmetric coupler, in optical communication with the SOA;
    a delay loop, in optical communication with the asymmetric coupler; and
    an output coupler, in optical communication with the delay loop.

2. The wavelength converter according to claim 1 wherein said delay loop includes:
    a short arm and a long arm, providing short and long optical paths respectively through the delay loop.

3. The wavelength converter according to claim 2 wherein the short arm of the delay loop has a phase shifter included therein.

4. The wavelength converter according to claim 3 further comprising:
    a filter, interposed between and in optical communication with the SOA and the asymmetric coupler.

5. The wavelength converter according to claim 3 wherein the SOA, the asymmetric coupler, the delay loop, the output coupler and the phase shifter are monolithically integrated onto a common substrate.

6. The wavelength converter according to claim 5 wherein the asymmetric coupler is a multimode interference (MMI) coupler.

* * * * *